(12) United States Patent
Ellis et al.

(10) Patent No.: US 8,006,001 B2
(45) Date of Patent: Aug. 23, 2011

(54) METHOD AND APPARATUS FOR MANIPULATING DIRECT MEMORY ACCESS TRANSFERS

(75) Inventors: Jackson Lloyd Ellis, Fort Collins, CO (US); Kurt Jay Kastein, Fort Collins, CO (US); Praveen Viraraghavan, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 1627 days.

(21) Appl. No.: 10/946,922

(22) Filed: Sep. 22, 2004

(65) Prior Publication Data

US 2006/0064516 A1    Mar. 23, 2006

(51) Int. Cl.
*G06F 13/10* (2006.01)
*G06F 13/14* (2006.01)

(52) U.S. Cl. ............................ 710/24; 710/22
(58) Field of Classification Search ............... 710/24, 710/22
See application file for complete search history.

(56) References Cited

U.S. PATENT DOCUMENTS

| | | | | | |
|---|---|---|---|---|---|
| 4,901,234 | A | * | 2/1990 | Heath et al. ................... | 710/40 |
| 5,870,627 | A | * | 2/1999 | O'Toole et al. ................ | 710/22 |
| 5,974,480 | A | * | 10/1999 | Qureshi et al. ................ | 710/27 |
| 5,991,817 | A | * | 11/1999 | Rowett et al. ................. | 709/250 |
| 6,081,849 | A | * | 6/2000 | Born et al. ..................... | 710/7 |
| 2004/0123013 | A1 | * | 6/2004 | Clayton et al. ............... | 710/310 |
| 2005/0210174 | A1 | * | 9/2005 | Hofmann et al. ............. | 710/263 |

OTHER PUBLICATIONS

Dave Pahl, Maximizing Data Transfer Efficiency with TMS320C500 DMA Controller, Sep. 12, 2001, TI's Monthly TMS320 DST Technology Webcast Series.*
HP-UX Process Management, Apr. 7, 1997, Hewlett-Packard Company, p. 95.*

* cited by examiner

*Primary Examiner* — Henry W Tsai
*Assistant Examiner* — Hyun Nam
(74) *Attorney, Agent, or Firm* — Yee & Associates, P.C.

(57) ABSTRACT

A mechanism is provided for removal of instructions for context re-evaluation. The mechanism receives an external request to perform the instruction remove. In response to this external request, the mechanism next determines when the state of the system is stable for allowing the instruction remove. Then the mechanism creates a first event to remove a current data instruction in a DMA, if present, and merge it back onto the list of pending contexts from where it originated. The mechanism waits for feedback that the first event has completed. Then the mechanism creates a second event to remove a pending data instruction that was chosen to be next in the DMA, if present, and merge it back onto the list of pending contexts from where it originated. Finally the mechanism waits for feedback that the second event has completed. The merging of contexts back onto the pending list from where they originated aborts any activity related to preparing further data instructions and holds off further decisions about which context to DMA next until the instruction remove procedure is completed and a correct priority decision can be made again. The result of the ability to remove instructions is that the system can respond to changing conditions on a protocol bus and be capable of preparing the best DMA instructions possible for optimizing the performance on the protocol bus.

22 Claims, 4 Drawing Sheets

METHOD AND APPARATUS FOR MANIPULATING DIRECT MEMORY ACCESS TRANSFERS

BACKGROUND OF THE INVENTION

1. Technical Field

The present invention is directed generally toward improved data storage. More particularly, the present invention relates to a method and apparatus in a data controller for retrieving, evaluating, and processing a context that describes a direct memory access request.

2. Description of the Related Art

One function of a data processing device is to move data based on a request, also referred to as a command, from an external system. For efficient operation, it is important that the data processing device maintains data movement between a requestor and a final storage medium without excessive processing overhead, whether the final storage medium is a disk drive, cd-rom drive, tape drive, flash memory or the like.

There are many approaches to controlling the movement of data based on a request from an external system. One approach is to use a microprocessor to process every boundary in the data flow via service interrupts. For example, when a request is made, an interrupt can be asserted to communicate to the microprocessor that a new command is available. The microprocessor can then evaluate the command and determine the size of the data transaction. If the request is a write command, the microprocessor allocates space to store the data, in either an internal or an external storage medium, and then processes the incoming data. A similar process is followed to read data from a storage medium in response to a read command.

The microprocessor may use a direct memory access (DMA) to physically move the write or read data between a requesting host device and the internal or an external storage medium associated with the storage device. Direct memory access uses specialized circuitry or a dedicated microprocessor to transfer data from memory to memory. For example, data may be moved from a buffer in a host bus adapter to a buffer in the storage device. The characteristics of a DMA transfer are typically defined using a context, which includes all of the information that is necessary in order for a storage controller included in the storage device to program a DMA transfer, whether that transfer is a read or a write. A context typically describes whether the transfer is to be a read or write to the drive, the length of the data to be transferred, and the current location of the data to be read or written.

The microprocessor may program a single context at a time, or it may queue up multiple contexts at a time for the DMA to transfer. A write DMA may exist for transferring the data represented by the queued write contexts and a read DMA may exist for transferring the data represented by the queued read contexts. For write contexts, the write DMA may be capable of swapping in the needed context as write data is received from the requesting host device. For read contexts, the read DMA usually continues to work on the same context until all the read data represented by the length of the context has been transferred to the requesting host device. When the DMA has completed the read context, then it can load another read context. As a result, when a read DMA is still working on the data transfer for a given read context, it is essentially blocked from transferring the data represented by other read contexts.

A storage area network (SAN) includes a SAN fabric, which is a combination of interconnected switches that collectively provide a routing infrastructure within the SAN. The SAN fabric may be, for example, a fibre channel (FC) fabric or other transport technology, such as a small computer system interface (SCSI) bus or, more particularly, serially attached SCSI (SAS) technology. In the SAS or FC bus protocol, full duplex transfers are possible. For example, as a initiator of commands in the system is sending new commands to a device, the device can simultaneously be returning read data from previous commands. This results in less time for the system to wait for this read data and improves system performance. In most of these protocols, the devices must arbitrate to gain access to transfer on the bus and there are cases when an arbitrating device might lose priority on the bus. For example, a device may configure a DMA read transfer for a pending command from a first initiator and then try to arbitrate for the SAS bus for this transfer. But then a second initiator may win arbitration on the SAS bus instead and open a connection to the device. The device may have other available read contexts whose data can be transferred on the open bus connection with the second initiator, but since the read DMA is already committed for a read context related to the first initiator, the device is not able to take advantage of the unexpected connection to the second initiator.

As another example, the read DMA may be transferring data for a read context when the host initiator device indicates that it wishes to close the bus connection without receiving the rest of the read data for this context. As in the lost arbitration case, the read DMA is again committed to the read context that it is currently working on and is unable to load another read context, perhaps for a different host initiator device, that would be more capable or higher priority for transferring data next in the read DMA. However, once the DMA is able to complete the transfer of the data represented by the programmed read context, then it can discard this context and choose a new context from the pool of queued read contexts. For example, now the DMA can choose the next context from the pool that is the highest priority for keeping the performance of the system high, where this priority may be a factor that is changing dynamically, for example, based on the amount of data that is ready to be transferred for a given context.

If an error or other exception condition occurs in any part of the handling of the request from a host initiator device, either the host initiator device or the data processing device may choose to abort the command or perform some other error handling procedure that may include altering or removing the context currently loaded in the read DMA. Since the read DMA is dynamic in nature, it can be simpler for the microprocessor to perform these procedures on contexts that are still in the pending pool of contexts instead of on the context that is loaded in the DMA.

From these examples, it is clear that a means is needed to put contexts that are loaded in a DMA back into the pending pool of contexts where it can be reconsidered in priority against the other pending contexts in the pool. These means must consider factors such as how the context has been modified since it has been in the DMA, the flushing of any pipeline that may exist between the pool and the DMA, and the communication with any logic associated with the pool that is tracking the state of the available contexts and deciding which context to send to the DMA next. The pipeline between the pool and the DMA may include local storage of one or more contexts that were chosen to be executed by the DMA after the context currently in the DMA assuming the DMA context completes normally. These contexts also need to be put back into the pool.

SUMMARY OF THE INVENTION

The present invention recognizes the disadvantages of the prior art and provides a mechanism for removal of instructions for context re-evaluation. The mechanism receives an external request to perform the instruction remove. In response to this external request, the mechanism next determines when the state of the system is stable for allowing the instruction remove. Then the mechanism creates a first event to remove a current data instruction in a DMA, if present, and merge it back onto the list of pending contexts from where it originated. The mechanism waits for feedback that the first event has completed. Then the mechanism creates a second event to remove a pending data instruction that was chosen to be next in the DMA, if present, and merge it back onto the list of pending contexts from where it originated. Finally the mechanism waits for feedback that the second event has completed. The merging of contexts back onto the pending list from where they originated aborts any activity related to preparing further data instructions and holds off further decisions about which context to DMA next until the instruction remove procedure is completed and a correct priority decision can be made again. The result of the ability to remove instructions is that the system can respond to changing conditions on a protocol bus and be capable of preparing the best DMA instructions possible for optimizing the performance on the protocol bus.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
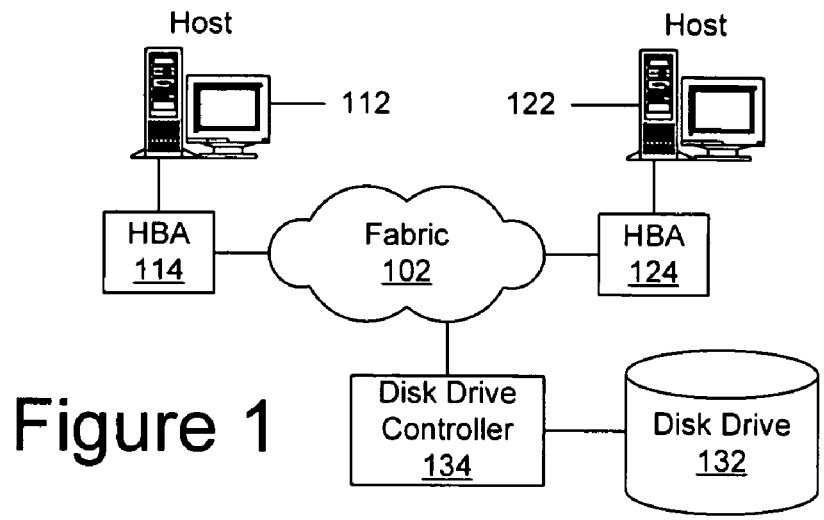
FIG. 1 depicts a pictorial representation of a storage area network in which exemplary aspects of the present invention may be implemented.

With reference now to the figures, FIG. 1 depicts a pictorial representation of a storage area network in which exemplary aspects of the present invention may be implemented. The storage area network (SAN) of FIG. 1 contains SAN fabric 102, which is a combination of interconnected switches that collectively provide a routing infrastructure within the SAN. Fabric 102 may be, for example, a fibre channel (FC) fabric or other transport technology. Alternatively, fabric 102 may simply be a bus, such as a small computer system interface (SCSI) bus or, more particularly, serially attached SCSI (SAS) technology.

In the depicted example, host 112 is connected to fabric 102 via host bus adapter (HBA) 114 and host 122 is connected to fabric 102 via HBA 124. Disk drive 132 is connected to fabric 102 via disk drive controller 134. Hosts 112, 122 may be, for example, personal computers, network computers, servers, or the like. In the depicted example, hosts 112, 122 access disk drive 132 through the SAN fabric. The SAN may include additional hosts and/or other storage devices not shown. FIG. 1 is intended as an example, and not as an architectural limitation for the present invention.

Figure 2:
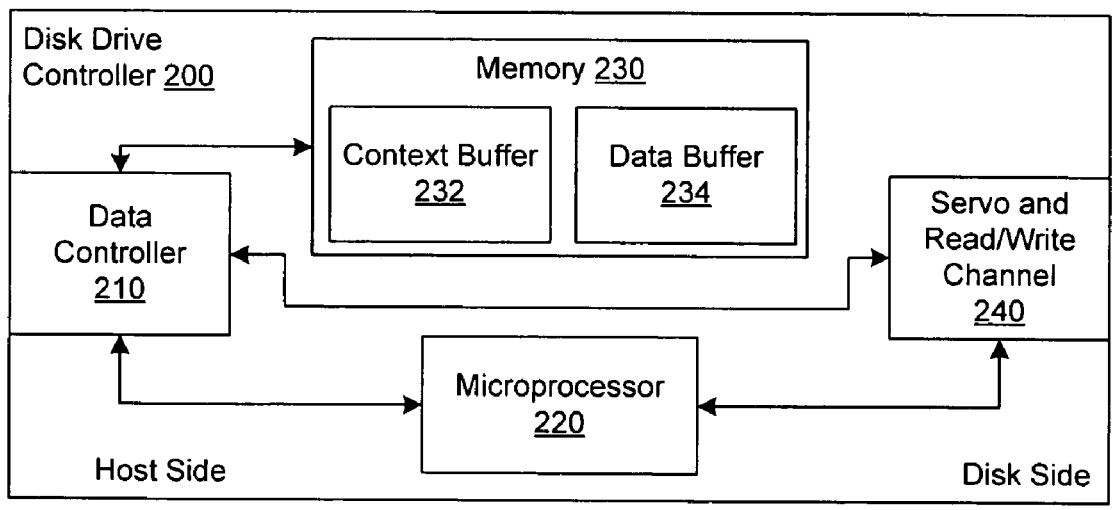
FIG. 2 is a block diagram illustrating a disk controller in accordance with an exemplary embodiment of the present invention.

FIG. 2 is a block diagram illustrating a disk controller in accordance with an exemplary embodiment of the present invention. The overall architecture of a disk controller is described in further detail in co-pending patent application entitled "SCALABLE ARCHITECTURE FOR CONTEXT EXECUTION," U.S. patent application Ser. No. 10/914,296, filed Aug. 9, 2004, and herein incorporated by reference. Disk drive controller 200 may be, for example, disk drive controller 134 in FIG. 1. Disk drive controller 200 includes a host side and a disk side. Disk drive controller 200 may be included in the electronics of a storage device. The storage device includes a data storage medium, such as storage disks, that is coupled to servo and read/write channel 240. On the host side, data controller 210 receives data transfer requests from one or more host devices connected by the fabric or protocol bus. On the disk side, servo read/write channel 240 moves data to or from the disk.

Servo and read/write channel 240 is coupled to a data controller 210 and a microprocessor 220. Data controller 210 is coupled to memory 230 and a peripheral bus, which is preferably part of a SAN fabric, such as fabric 102 in FIG. 1. Memory 230 is preferably a synchronous dynamic random access memory (SDRAM) based memory device and is logically divided into several segments. These segments include context buffer 232 and data buffer 234. A DMA request from an HBA, such as HBA 114 or 124, is represented by a context structure within data controller 210. The context structure includes all of the information that is necessary in order for a storage controller, such a microprocessor 220 or other context management hardware in data controller 210, to program a DMA transfer from the peripheral bus through the data controller 210 to the data buffer 234, whether that transfer is a read or a write. Lists of contexts whose DMA transfer has not yet occurred are temporarily stored in context buffer 232. A context typically defines whether the transfer is to be a read or write to the drive, the length of the data to be transferred, and the current location of the data to be read or written. The data to be transferred to the host (read) or transferred to the storage medium (write) is stored in data buffer 234.

The general function of data controller 210 is to process commands from a requester or initiator, such as host computer 112 in FIG. 1. A host computer can be a personal computer, workstation, server, or other peripheral device. Data controller 210 performs data transfers associated to those commands with the data storage medium, e.g., magnetic or optical disk. In more detail, data controller 210 processes the commands for the associated data transfers. The commands may not request data transfers, but may request status of the storage device. Data controller 210 must also process these commands. For commands that request write data transfer, data controller 210 first transfers data from the peripheral bus to the data buffer 234, then from the data buffer 234 to the Servo and Read/Write Channel 240. For commands that request read data transfer, the data controller 210 first transfers data from the Servo and Read/Write Channel 240 to the data buffer 234, then from the data buffer 234 to the peripheral bus.

Data controller 210 may be coupled to multiple host computers or multiple host bus adapters within a single host computer. Data controller 210 may contain multiple read and write commands from these multiple sources at the same time. In this case, a context within data controller 210 can represent which host computer or host bus adapter has provided the request represented by the context. Within the description of this invention, "host computer" or "host" is used as a generic term to refer to the specific host computer or host bus adaptor that provided the read or write command represented by the current context being processed.

Different bus architectures and protocols exist for providing commands to disk drive controller 200. Such architecture and protocols are defined by, for example, advanced technology attachment (ATA), industry standard architecture (ISA), integrated drive electronics (IDE), universal system bus (USB), small computer system interface (SCSI), serially attached SCSI (SAS), and fibre channel (FC) standards. For example, a SCSI command known as control descriptor block (CDB) includes an operational code consisting of a group code and a command code, a logical unit number, logical block addresses (LBAs) if required, a transfer length value if required and a control byte. The transfer length value specifies the number of blocks (or other data units) that are to be transferred with an associated command. Thus, data controller 210 must be able to at least process one of those command protocols. These commands, which request for the data controller to transfer read data or write data, are referred to herein as direct memory access (DMA) commands or DMA requests.

Figure 3:
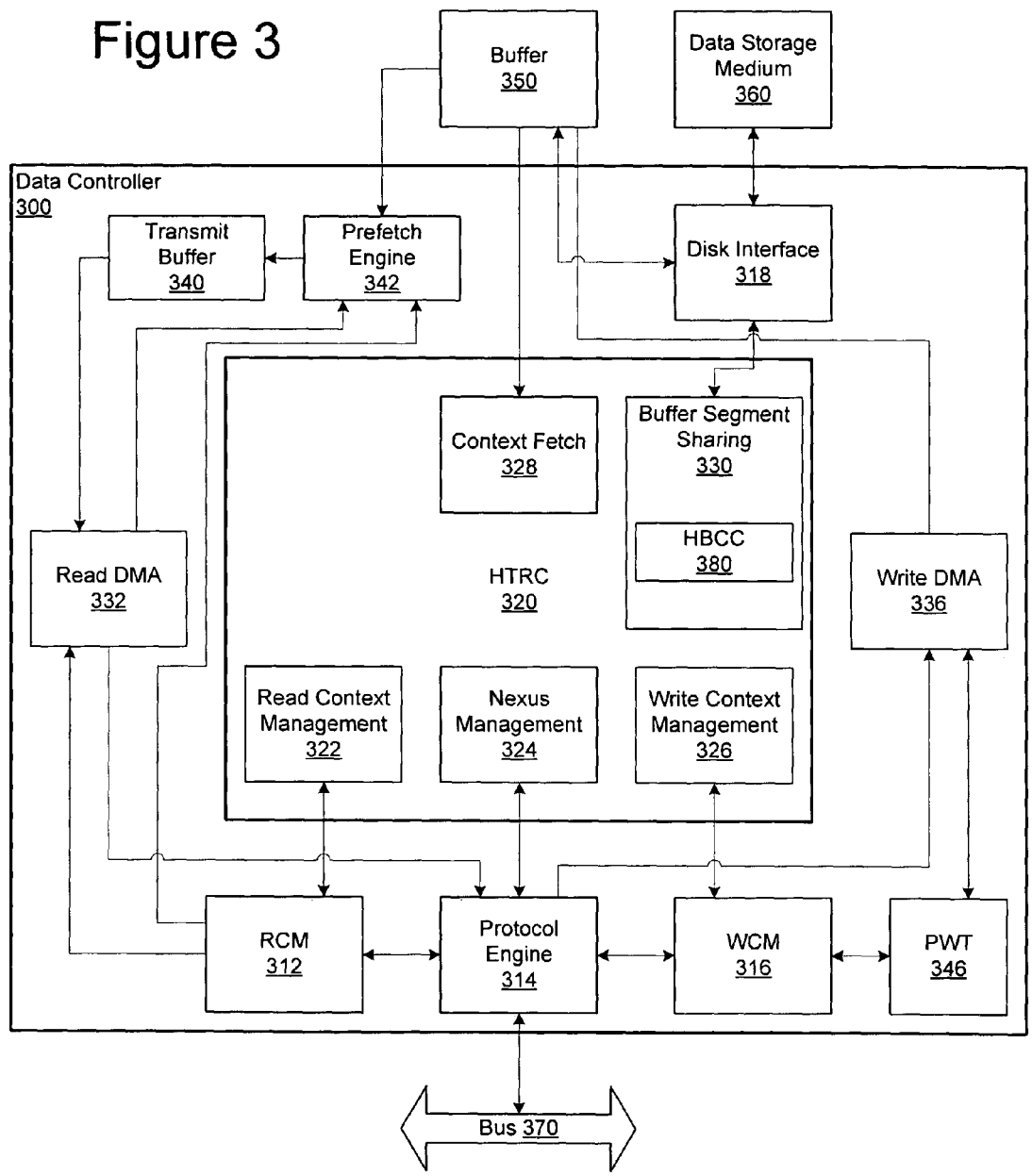
FIG. 3 illustrates a device included within a disk data controller in which exemplary aspects of the present invention may be implemented.

FIG. 3 illustrates a device 300, included within a disk data controller 210 in FIG. 2, in which exemplary aspects of the present invention may be implemented. Device 320 is referred to herein as a host thread retrieval channel (HTRC). The operation of a disk controller and, in particular, a host thread retrieval channel is described in further detail in co-pending application entitled "METHOD OF PROCESSING A CONTEXT FOR EXECUTION," U.S. patent application Ser. No. 10/910,000, filed Aug. 3, 2004, and herein incorporated by reference. HTRC 320 includes a context fetch 328 mechanism for fetching contexts from a context buffer located in buffer 350, a nexus management 324 coupled to a protocol engine 314, a read context management mechanism 322 coupled to a read context manager 312, a buffer segment sharing mechanism 330 coupled to a disk interface 318, and a write context management mechanism 326 coupled to a write context manager 316. Read context manager 312 is coupled to a read DMA (RDMA) 332, a prefetch engine (PENG) 342 and a protocol engine 314. Write context manager 316 is coupled to a pending write table (PWT) 346 and a protocol engine 314. Pending write table (PWT) 346 is coupled to write DMA (WDMA) 336. Nexus management 324 determines whether the communications protocol connection is already established between the disk controller and the host initiator device represented by the context in context fetch 328. Protocol engine 314 is coupled to read DMA (RDMA) 332, write DMA (WDMA) 336 and a bus 370, which may be, for example, a SAS bus. Buffer 350 is coupled to prefetch engine 342, write DMA 336 and disk interface 318. Buffer 350 may be, for example, memory 230 in FIG. 2. Disk interface 318 is coupled to data storage medium 360.

While one HTRC is shown in the depicted example, data controller 300 may include more such devices. In an exemplary embodiment, data controller 300 may include three HTRC devices. Each HTRC 320 has a pointer in context fetch 328 to a list of contexts in buffer 350. The HTRC fetches a next context from this list into context fetch 328. Each context has a transfer length that represents the number of sectors to be transferred, a buffer address pointer to a memory location in the buffer where the data is to be written or read, and a logical sector address (LSA) that indicates the location for this sector on the disk media. When HTRC 320 loads a context, this field typically represents the original transfer length of the command received from the host initiator device. The HTRC has buffer segment sharing mechanism 330, which contains host buffer contents counter (HBCC) 380 that manages the quantity of sectors in the buffer segment across the entire context list that HTRC 320 is retrieving. Thresholds are established for HBCC 380. For example, HTRC 320 may wait to issue an instruction until there is enough data to transfer to make it worthwhile to open a new connection on bus 370. These thresholds are compared against the current value of the HBCC and used, along with other criteria such as the state of the bus 370 as detected by nexus management 324, to determine when the context in context fetch 328 should be enabled to start transferring on bus 370. If the context is enabled to start transferring, read context management 322 or write context management 326 issues an instruction to the coupled read or write context manager (312 or 316) for an amount of data that is less than or equal to the amount of data left to transfer represented by the context in context fetch 328. If the transfer length of the instruction generated by the HTRC 320 is less than the size of the original length to be transferred by the context, HTRC 320 will issue more than one instruction for the context. Once it is determined that an instruction should be issued by HTRC 320, HTRC 320 decrements the context transfer length in context fetch 328 by the size of the transfer length in the instruction to be issued, measured in sectors. When this adjustment is complete, the instruction request is asserted to the RCM or WCM. After the instruction is acknowledged by the RCM or WCM, the buffer address pointer is incremented by the number of bytes represented by the instruction transfer length so it points to where a new instruction will want to transfer data. Also, the LSA is incremented by the instruction transfer length so it represents the sector address for the sector following the sectors represented by the instruction. Then the remaining transfer length in the context fetch 328 is compared with the thresholds and HBCC 380 to determine when an additional instruction can be issued. Once the context transfer length in context fetch 328 is adjusted to zero, then the context is discarded and the next context in the buffer 350 context list is fetched into context fetch 328.

When a HTRC 320 has a write context, write context manager (WCM) 316 is the interface between HTRC 320 and the receive instruction block in protocol engine 314. WCM 316 takes requests from one or more HTRCs for write data instructions, arbitrates between the requests, asserts a receive instruction request to protocol engine 314 for the winning request, copies the instruction to PWT 346 and passes the acknowledgement for the instruction request from protocol engine 314 back to the originating HTRC's Write Context Management 326. Until the protocol engine gives the acknowledgement for the WCM's receive instruction request, the WCM will ignore other HTRC requests for write data. The protocol engine will give this acknowledgement as soon as it is starting to send a request for write data to the host initiator device on bus 370. One or more HTRCs may have multiple outstanding requests for write data that have been sent on bus 370. Each of these outstanding write data instruction requests will be represented by a single entry in PWT 346.

Read context manager (RCM) 312 is the interface between the HTRCs containing read contexts and the transmit instruction block in protocol engine 314. RCM 312 takes requests from one or more HTRCs for read data instructions, arbitrates between the requests, loads the winning HTRC 320 instruction to RCM 312, asserts a transmit instruction request to protocol engine 314 for the winning request, copies the instruction to PENG 342 and RDMA 332, and passes the acknowledgement for the instruction request from protocol engine 314 back to the originating HTRC's Read Context Management 322.

The prefetch engine (PENG) 342 is the interface between the buffer 350 and the transmit buffer (TXB) 340 FIFO. PENG 342 is loaded with an instruction from the RCM 312 and then transfers the amount of data specified by the transfer length in this instruction from the buffer to the TXB FIFO. The PENG 342 and TXB 340 hide the latency to access the buffer 350 from the read DMA 332 and bus 370. The address location for the transfer in buffer 350 is specified by the buffer address pointer field in the instruction.

The read DMA (RDMA) 332 is the interface between the data transmit block in protocol engine 314, the TXB 340 and the RCM 312. The RDMA 332, once loaded with an instruction from the RCM 312, will transfer data from the TXB 340 to the data transmit block in protocol engine 314. The data transmit block of protocol engine 314 formats this data for transmission on bus 370. RDMA 332 decrements the instruction transfer length by 1 sector for each sector that is transferred.

For write instructions, protocol engine 314 responds to instructions in WCM 316 by transmitting requests for write data to the requesting host initiator device on bus 370, and then giving the instruction to the PWT 346. PWT 346 receives write instructions from WCM 316 and stores them in a RAM that can hold multiple pending instructions. The WDMA 336 monitors the data receive block in protocol engine 314 for write data that has been received from the host initiator device in response to the request for write data. When the WDMA 336 detects that write data is present in the data receive block, it performs a request to PWT 346 for the instruction that is associated with this data. This instruction is fetched from the RAM in PWT 346 and loaded into the WDMA 336. The WDMA 336, once loaded with an instruction, will transfer data from the data receive block in protocol engine 314 to the buffer segment starting at the buffer address pointer specified in the instruction. The data receive block of protocol engine 314 removes the protocol format from the data received from bus 370. WDMA 336 copies the instruction, with the remaining transfer length, back to PWT 346 when either the remaining transfer length is zero or when the data receive block indicates that write data exists for a different instruction. When PWT 346 receives an instruction from WDMA 336 whose remaining transfer length is not zero, it stores the instruction back into the PWT 346 RAM. When PWT 346 receives an instruction from WDMA 336 whose remaining transfer length is zero, it discards the instruction since it is complete.

As WDMA 336 and RDMA 332 transfer data with a buffer segment, disk interface 318 also transfers data with the same buffer segment. On a write transfer, data is transferred in order from bus 370, to protocol engine 314 data receive block, to WDMA 336, to a data buffer, also called a buffer segment, located in buffer 350, to disk interface 318, and to data storage medium 360. On a read transfer, data is transferred in order from data storage medium 360, to disk interface 318, to a data buffer located in buffer 350, to PENG 342, to TXB 340, to RDMA 332, to the protocol engine 314 data transmit block, and to bus 370. The servo and Read/Write Channel 240 from FIG. 2 is located between disk interface 318 and data storage medium 360.

HBCC 380 is a variable that is loaded with the number of sectors available in the buffer segment for disk read operations or the amount of sectors already in the buffer for disk write operations (both are typically 0 for new read and write commands). The HBCC is decremented by the transfer length of each read instruction and incremented by the transfer length of each write instruction. The HBCC is also incremented by one for reads and decremented by one for writes each time a sector is transferred correctly over disk interface 318 with buffer 350.

When the HBCC equals zero for a read, the buffer segment is empty; when the HBCC equals the segment size for a write, the buffer segment is full. The segment size variable defines the size in sectors of a buffer segment. A buffer segment is the part of the total buffer that has been assigned for use by the current DMA transfer that is being managed by the HTRC. On a write, data is transferred into the buffer segment by WDMA 336. On a read, data is transferred from the buffer segment by RDMA 332. When the buffer segment is empty for reads or full for writes, the HTRC 320 is prevented from issuing further instructions to continue the DMA transfer.

Multiple devices can exist on bus 370 that compete for the opportunity to temporarily own the bus, for example, to send commands or data. An arbitration process is used to determine a winner between the competing devices to see who can use the bus next. Once a device has won arbitration, then it can make a connection with a single other device on bus 370 and transfer information on bus 370 to or from the other device. When the device is done with its transfer of information, then it releases the bus and a new arbitration process occurs to determine the next owner. Protocol engine 314 participates in these arbitration processes in behalf of data controller 300. When protocol engine 314 sees a request from RCM or WCM to transfer data with a host initiator device, it first checks to see if a connection with the host initiator device already exists on bus 370. If it does, then the transfer can begin immediately. If it does not, then protocol engine 314 begins to attempt to win arbitration to own bus 370 so it can make this connection. The result of this arbitration attempt can be that it wins and makes the desired connection. In this case, the transfer requested by the WCM or RCM can begin. Another possible result is that it loses arbitration but the winning device is the same host initiator device that is represented by the RCM or WCM instruction request. If this winning device makes a connection with data controller 300, then the desired connection is made and the transfer requested by WCM or RCM can begin.

However, if the winning device makes a connection with data controller 300 but it is not the same host initiator device that is requested by the WCM or RCM instruction, then the connection cannot be used to perform the transfer requested by the WCM or RCM. In this case, protocol engine 314 may wish to remove the current WCM and/or RCM instructions from the RCM/WCM and return them back to their original HTRCs, specify a new nexus state to nexus management 324, and then see if any HTRCs are able to give the RCM/WCM an instruction that matches this nexus. If an HTRC does have a context that can transfer with this host initiator device, then it will request to the RCM/WCM and the protocol engine will allow this transfer to take advantage of the unexpected bus connection to improve the performance of the system. Protocol engine 314 can request the instruction remove whenever it sees that the RCM/WCM instruction specifies a different host initiator device than the one associated with the current bus connection. Protocol engine 314 can make this determination separately for the RCM and WCM and can have a separate instruction remove request for the RCM and WCM. For example, if the RCM matches but the WCM does not match, then the instruction remove request can be given only to the WCM while data transfer begins for the instruction from the RCM.

Another case where an instruction remove may be requested by protocol engine 314 is when a bus connection on bus 370 is terminated by the host initiator device before all of the data for a given instruction has been transferred. For example, a context in HTRC 320 wishes to read 100 sectors and the buffer segment associated with the HTRC is only 30 sectors. Assuming the buffer segment starts full, a first instruction for 30 sectors is given from HTRC 320 to RCM 312. Protocol engine 314 wins arbitration and RDMA 332 receives the instruction from RCM 312 and begins the data transfer. RCM 312 discards the instruction since it has been passed to the protocol engine 314, RDMA 332, and PENG 342, and perhaps receives a new instruction from the same or a different HTRC. After transferring 15 sectors, the host initiator device closes the connection. A new bus connection is now needed to complete the instruction that is in RDMA 332, but RCM 312 no longer has the instruction for initiating a new request to protocol engine 314. Protocol engine 314 performs an instruction remove to place the remaining 15 sectors back into the HTRC. The context in HTRC 320 now has 85 sectors left to transfer. If the buffer segment has been backfilled and is full again, the HTRC will issue a new instruction for 30 sectors to the RCM. Now the RCM can request again for protocol engine 314 to arbitrate and create a bus connection again.

Another reason for performing an instruction remove is to remove all outstanding instructions to make the state of the data controller 300 simpler for a firmware exception handling routine. For example, if data controller 300 needs to abort a command that is currently represented by a context that is in HTRC 320, a first instruction that is in RDMA 332 and PENG 342, and a second instruction that is in RCM 312, then it must work with all of these blocks to delete this command. But if an instruction remove is executed by the microprocessor first to collapse all of these instructions back into the context in the HTRC, then the microprocessor will only need to work with the HTRC to delete this command.

A possible alternative to performing instruction removes is to interrupt the microprocessor at each of these blocking points and have the microprocessor manually place the instructions back into their respective HTRCs. In this case, there is much more complexity for the microprocessor because the RCM could be holding an instruction from HTRC0, but the RDMA could be transferring data for an instruction from HTRC1. In this case, the instruction in the RCM has to go back to HTRC0 and the partial instruction for the RDMA has to go to HTRC1. The HTRC tracks the data available for reads and space available for writes and both of these numbers, as well as other tracking numbers such as transfer length, the location of the data in the external memory, and running cyclical redundancy check (CRC), must be restored. The disadvantage of this solution is that the cleanup for the microprocessor becomes complex due to the number of pending instructions and the number of HTRC devices. The microprocessor would need to be dedicated to this cleanup, which would prevent other interrupts from being serviced.

There are also many boundaries that must be managed. For instance, the host works in data partitions called sectors, which are a different size than what the protocol engine uses. Each sector is protected with CRC. The CRC is not transferred to the protocol engine. The CRC is checked and removed by the RDMA. There may be a case when the sector has been sent and the protocol engine terminates the bus connection, but the CRC is not available from the buffer 350 because the buffer arbitrator has moved to another requesting channel, such as disk interface 318. Since this boundary between data and CRC cannot be represented back in the HTRC, the RDMA must wait until the CRC is available and checked, and only then allow the instruction remove to happen.

The present invention allows for the instruction remove operation to be performed in hardware without assistance from the microprocessor. The write instruction remove is really a restore to original values, because the data movement is tracked by the PWT. Therefore, the instruction can only be removed before it is presented to the protocol engine. Once the protocol engine has acknowledged the instruction, the instruction is moved to the PWT and cannot be merged back into the HTRC. Consider an example of a write instruction. The HTRC starts with a write context that is for a transfer length of 10 sectors at LSA 40. The segment of buffer space holds 10 sectors. The HBCC is zero, meaning that all 10 sectors of space are available. The sector size is 512 bytes. The buffer address pointer for these sectors in the context is initially pointing to location 0. The buffer address pointer points to physical addresses in the buffer. Each sector takes up 512 locations in the buffer memory.

In this case, the HTRC determines to issue an instruction with a transfer length of 10 sectors and decrements the HTRC context's transfer length by this amount, which results in a value of zero. This occurs before the HTRC requests the WCM to service the instruction. The HTRC will not request the WCM unless either protocol engine 314 is on the bus with the initiator that is associated with the context in the HTRC, or the protocol engine is off the bus. The protocol engine in the first case can use the same connection to send the write instruction; however, in the second case, the protocol engine has to arbitrate to own the bus first. If the protocol bus changes state before the WCM can acknowledge the HTRC's request, then the protocol engine asserts the instruction remove signal to the host logic. This is a case of a context restore. The instruction transfer length is added back to the transfer length in the context. The buffer address pointer, LSA, and HBCC are still at their original values and do not need to be adjusted by the instruction remove. The HTRC context has now been returned to its original state.

Now consider the instruction remove of a read request. If an instruction remove for a read is requested when there are no contexts or instructions in HTRC 320, RCM 312, and RDMA 332, then it has no effect. If RCM 312 and RDMA 332 do not have an instruction but HTRC 320 does have a context, then an instruction remove for a read will have the same effect as the context restore example for the write that is described above. This effect is to cancel any activity related to issuing an instruction to the RCM and to restore all of the HTRC context fields back to the correct initial state given there are no instructions pending.

However, read instruction removes have additional cases to handle since instructions can be stored in both the RDMA and the RCM when protocol engine 314 requests the instruction remove. These instructions may represent more than one context from the same or from different HTRCs. It is possible that only one instruction exists and it is in the RCM or RDMA. It is also possible that two outstanding instructions exist with the first in the RDMA and the second in the RCM. In this case, the PENG may be working on either of these instructions. The instruction in the PENG is always discarded on a read instruction remove and its information is not needed to restore the HTRC context. The TXB is always reset to the empty state on a read instruction remove. The steps of resetting the PENG and TXB are performed after making sure the RDMA has checked the CRC in the case where the RDMA is at a sector boundary, but before trying to restore the HTRC context using information from the RDMA or RCM. The PENG transfer is terminated before resetting the TXB to make sure the TXB stays empty after the reset.

Consider the case where the RCM and/or RDMA has an instruction, but the RDMA has not transferred any data for this instruction yet. In an example for this case, HBCC initially has 10 sectors available, the LSA is 40 and the buffer address pointer is at 0. The HTRC determines to issue an instruction for 10 sectors, and decrements the transfer length of the context by this amount, which results in a value of zero (this is now the pre-adjusted HTRC context transfer length). The HTRC then requests to the RCM. When an acknowledgement is received from the RCM, the instruction is copied to the RCM. This instruction includes the instruction's transfer length and also all of the context information from the HTRC context, including the pre-adjusted HTRC context transfer length. In this example, the pre-adjusted HTRC context transfer length is zero. The acknowledge tells the HTRC that the RCM is committed to transfer 10 sectors and the HTRC now adjusts the buffer address pointer and LSA to reflect where the read will finish. Therefore, if the buffer address pointer initially points to location 0, then after the acknowledgement, the buffer address pointer will point to 5120 in the HTRC context. At the RCM acknowledgement, the LSA will also increment from 40 to 50 and the HBCC will decrement from 10 to 0. The HTRC is now ready to work on the next context or, alternatively, the next instruction if the first was only a partial instruction that did not cover the overall transfer length of the context. However, the next instruction will have to wait until the HBCC indicates that more data is available in the buffer.

An outstanding committed sector release counter in the HTRC is maintained for the purpose of restoring the HBCC on a read instruction remove. The outstanding committed sector release counter is incremented by the instruction transfer length for each instruction that is acknowledged by the RCM. It is decremented by 1 for each sector that the RDMA transfers successfully. On the read instruction remove, this counter represents the number of outstanding sectors across any outstanding instructions in the RCM and RDMA that need to be added back to the HBCC. Note that this counter can optionally be used on write instructions removes as well to adjust the HBCC.

In the example, the instruction is moved to the RDMA and PENG as the protocol engine begins servicing it and, in the background, the PENG starts reading the data from the buffer memory. At the moment when RDMA has the instruction, the RCM may then receive a new instruction from the HTRC or another HTRC. If the instruction in the RCM is from the same HTRC as the HTRC that submitted the instruction in the RDMA, then it is the RDMA's instruction that is placed back into the HTRC. If the instruction in the RCM is from a different HTRC, then the RCM's instruction will go back to its HTRC and the RDMA's instruction will go back to its different HTRC.

When the protocol engine does a read instruction remove before any data is transferred by the RDMA, the adjusted totals are placed back into the HTRC to get the HTRC back to the original values as if the currently outstanding instructions had not been issued. In this case, the HBCC is adjusted back by adding the outstanding committed sector release counter to the HBCC, returning it to 10. The outstanding committed sector release counter is then zeroed out in the HTRC. The transfer length of the HTRC context is set equal to the value obtained by adding the RDMA's instruction transfer length to the RDMA's pre-adjusted HTRC context transfer length. This will be the correct value for the HTRC context transfer length even if there is another instruction from this HTRC in the RCM. The buffer address pointer and LSA from the instruction in the RDMA are placed back into the HTRC, overwriting the values in the HTRC context. The other static configuration values held in the RDMA instruction are also moved back into the HTRC context, overwriting the values in the HTRC context.

If in the above example a second instruction from the same HTRC had been in the RCM when the instruction remove occurred, this instruction would have simply been discarded. The procedure to restore the HTRC context so it represents both the RDMA and RCM instructions again does not need the information from the RCM. If in the above example the only instruction had been in the RCM, then the same result would have occurred except the information to copy back to the HTRC would have been taken from the RCM instead of from the RDMA.

Now consider modifying the above example to create a case where the RDMA has started the transfer to the protocol engine before the read instruction remove is issued. The difference here is that the dynamic values in the RDMA have changed because data has been moved. Consider, for example, that the original instruction requests to transfer 10 sectors and the RDMA has transferred two and a half sectors before the remove is received from the protocol engine. The RDMA's buffer address pointer would show 1280, rather than 0. The LSA, if started at 40, would show 42 in the RDMA context. The instruction's transfer length decrements each time a new sector is started and would decrement from 10 to 7, and a sector byte count would show 256 (half a sector). The RDMA's sector byte count is loaded with the sector size in bytes (512 bytes) each time a new sector is started and decrements by 1 as each byte is transferred from the RDMA to the protocol engine. The running sector based CRC check in the RDMA would have some partially calculated value based on the 256 bytes of data that was transferred for the third sector. On every sector that the RDMA successfully transfers to bus 370, the outstanding committed sector release counter is decremented; therefore, the outstanding committed sector release counter now reflects 8 in the HTRC.

When the read instruction remove occurs, these values are used to put the HTRC context back to the proper state so as to appear as if there are no instructions outstanding but 2.5 sectors have been transferred so far. The outstanding committed sector release counter is added to the HBCC to cause the HBCC to indicate that 8 sectors are available in the buffer segment for a new instruction. The HTRC context's transfer length is set equal to the value obtained by adding the RDMA's instruction transfer length (7) to the RDMA's pre-adjusted HTRC context transfer length (0), resulting in 7. A sector byte count in the HTRC, which is normally zero, now reflects the partial sector and, thus, is loaded from the RDMA's sector byte count, which is 256 bytes. The HTRC context's buffer address pointer is copied from the RDMA's buffer address pointer, which is 1280. So any new instructions from this HTRC begin their read of the external memory from location 1280. The HTRC context's LSA is copied from the RDMA's LSA, which is 42. A CRC seed in the HTRC, which normally is zero, is loaded from the RDMA's remaining CRC value. This CRC seed along with the sector byte count will be passed with the next instruction from this HTRC to the RCM and then RDMA so the RDMA can resume its transfer correctly in the middle of this sector. When the sector byte count is non-zero, internal lengths used in the HTRC to compare against the HBCC and other thresholds reflect a plus one value to account for the partially transferred data.

In the case that the RDMA is working on a first instruction from a first context from an HTRC, the RCM has received a second instruction that is from a second context from the same HTRC, and the HTRC has fetched a third context from the linked list of contexts in the buffer, the second and third contexts will be discarded by the instruction remove. This is possible since these contexts have not been modified since they were fetched from the buffer. The first context will be rebuilt in the HTRC using the current state of the instruction in the RDMA. The HTRC's pointer to the list of contexts in the buffer will be restored to point to the first context. Once instructions are re-issued that represent the remaining transfer length in the first context, the HTRC's pointer to the list of contexts will be modified to point to the second context and the second context will be re-fetched from the buffer into the HTRC.

In any instruction remove, any flags or other indications in the HTRC, RCM, WCM, PENG, or TXB related to the existence of an instruction request or to outstanding instructions must be reset. However, before allowing an instruction remove to alter the state of any block, any pending activity that is related to bringing the state of the block to a static state should be allowed to complete. This includes any activity related to finishing the processing of instructions or contexts that have completed normally before the instruction remove. The state immediately following an instruction remove is that the HTRCs have contexts but there are no instructions or instruction requests present in the system. This can be independent between read and write HTRCs though. For example, a read instruction remove does not affect any of the blocks working on write transfers and a write instruction remove does not affect any of the blocks working on read transfers. If there are multiple protocol engines to control multiple protocol buses (usually referred to as multiple ports), then instruction removes requested from one protocol engine do not affect blocks in the system working on a transfer related to the other protocol engine.

Figure 4:
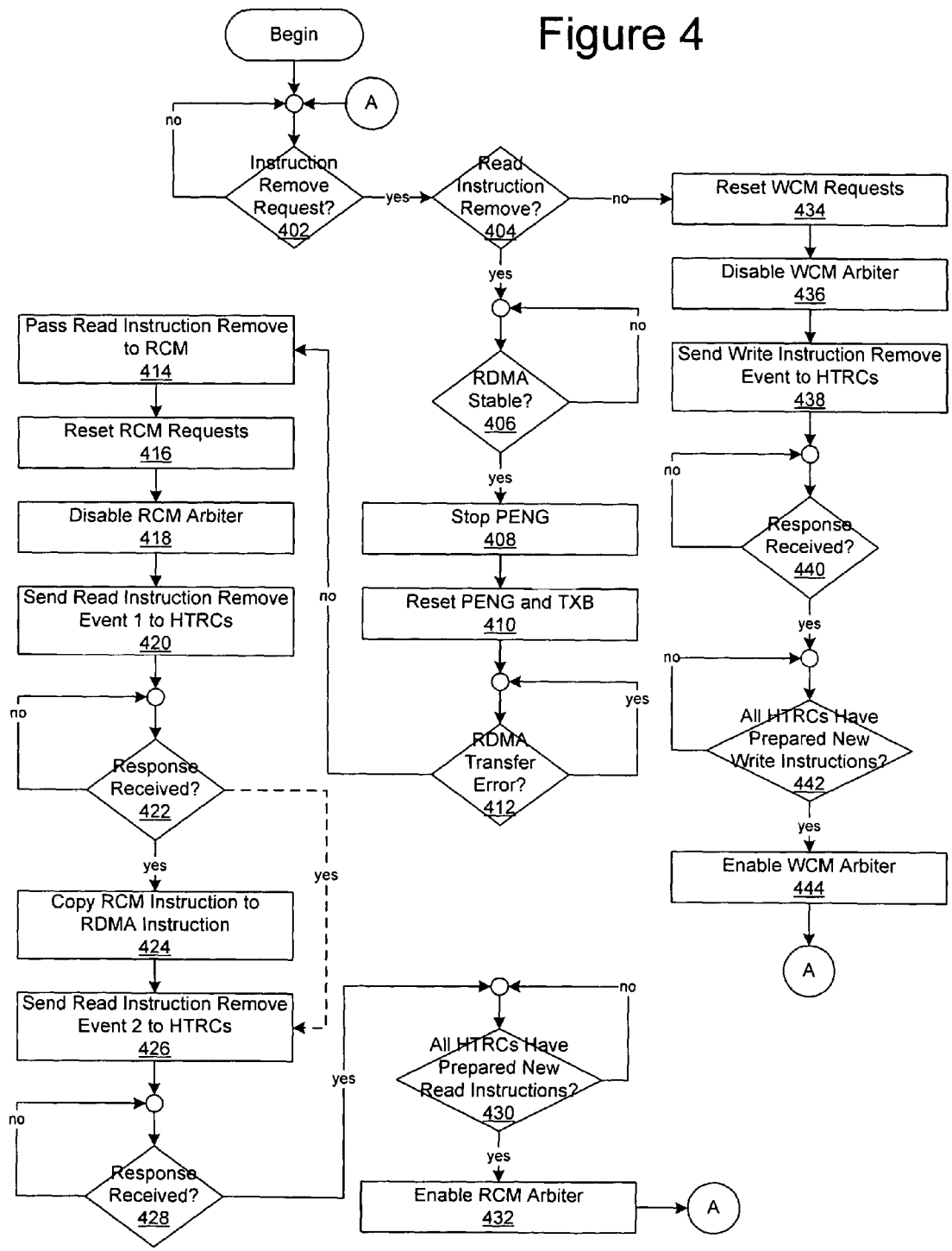
FIGS. 4 and 5 depict a flowchart, which illustrates the operation of data transfer with instruction removal in accordance with a preferred embodiment of the present invention.

FIG. 4 illustrates the high level operation of data transfer with instruction removal in accordance with a preferred embodiment of the present invention. More particularly, with reference to FIG. 4, operation begins and continues as normal with the HTRCs fetching contexts and generating data transfer instructions for system to process. The instruction remove sequence is running in parallel with this normal operation. The instruction remove sequence waits until the protocol engine requests for an instruction remove as based on criteria already described above, such as detecting an unexpected open or close of a bus connection with a host initiator device (block 402). The protocol engine may choose to perform both a read instruction remove and a write instruction remove at the same time, or it may choose to only perform the instruction remove that is needed to remove instructions that are pending.

After detecting an instruction remove from the protocol engine, block 404 checks if the instruction remove is for a read. If so, then the RDMA receives this instruction remove request starting with block 406. Otherwise, the WCM receives this instruction request starting with block 434. In block 406, the RDMA first completes any pending tasks so as to reach a stable state. This can include finishing the CRC check and possibly other actions regarding the completion of an instruction whose data has all been transferred. Once the RDMA is at a static boundary in block 406, it requests for the PENG to stop its prefetch transfer (block 408), and then the PENG and TXB are reset (block 410). This means that the PENG and TXB have no valid instructions and all flags and counters related to transfers are reset. Once the RDMA has confirmation that the PENG and TXB have been reset, then it verifies that there have been no errors detected during the RDMA data transfer so far (block 412). If an error, such as a CRC error, has been detected, then the instruction remove is ignored until the error condition is handled and cleared by the microprocessor. If no error condition exists in block 412, then the read instruction remove request is passed from the RDMA to the RCM (block 414).

The RCM resets any requests to load the PENG or RDMA and also resets any request to the protocol engine (block 416). It also disables the local RCM arbiter of HTRC requests so it will ignore any HTRC requests that may be pending (block 418). Now that the RCM is in a static condition, it creates two read instruction remove events that are passed to all of the HTRCs. Each of these events consists of a request given to the HTRCs with feedback from the HTRCs that the request has been serviced. The first read instruction remove event (block 420) causes each HTRC to look at the RDMA's context to determine if the specific HTRC is the originator of the RDMA's instruction. The RDMA provides a separate valid signal to each HTRC to indicate whether its instruction is from the HTRC. If an HTRC detects that it is the originator of the instruction in the RDMA, then it uses the information in the RDMA's instruction to adjust its context and then ignores the second read instruction remove event. Otherwise, the HTRC takes no action on the first event. See FIG. 5 for more detail. When the RCM receives a response back from the HTRCs in block 422, the first event is complete. An optional step in block 424 can be performed at this time as described below. If this optional step is not performed, then block 422 proceeds to block 426.

The second read instruction remove event (block 426) causes each HTRC to look at the RCM's context to determine if the specific HTRC is the originator of the RCM's instruction. The RCM provides a separate valid signal to each HTRC to indicate whether its instruction is from the HTRC. If an HTRC detects that it is the originator of the instruction in the RCM, and it was not also the originator of the instruction in the RDMA, then it uses the information in the RCM's instruction to adjust its context. If an HTRC is not the originator of an instruction in either the RCM or the RDMA, but it does have a valid read context that is currently being processed to create an instruction request to the RCM, then this processing is aborted and the context is restored to its initial state as existed before this processing was started. Otherwise, the two read instruction remove events have no other effect on the HTRCs. See FIG. 5 for more detail. Once the RCM has confirmation that the second of these events have been completed (block 428), it waits for another confirmation from each HTRC that each HTRC has finished a new process to create a read instruction request, if a read instruction request is possible at this time (block 430). Then the RCM enables its arbiter to start looking at the HTRC requests again (block 432) and activity continues as normal, returning to block 402. Waiting for the HTRCs to all have a chance to get their instruction requests active again in block 430 allows the RCM to see as many requests as possible and to select the highest priority HTRC that can issue an instruction to go next.

An option exists in block 424 to also help reduce the number of routes necessary to make all of these connections. After the first event is complete but before the second event has begun, the instruction in the RCM may be copied to the RDMA using the normal routes that exist for passing instructions from the RCM to the RDMA. Then the read instruction remove instruction information can always be taken from the RDMA's instruction, even for the second event. This can be especially helpful to reduce the number of required routes as multiple HTRC and/or multiple RCM/RDMAs are added into the system. When block 424 completes, operation continues at block 426 as described above.

Figure 5:
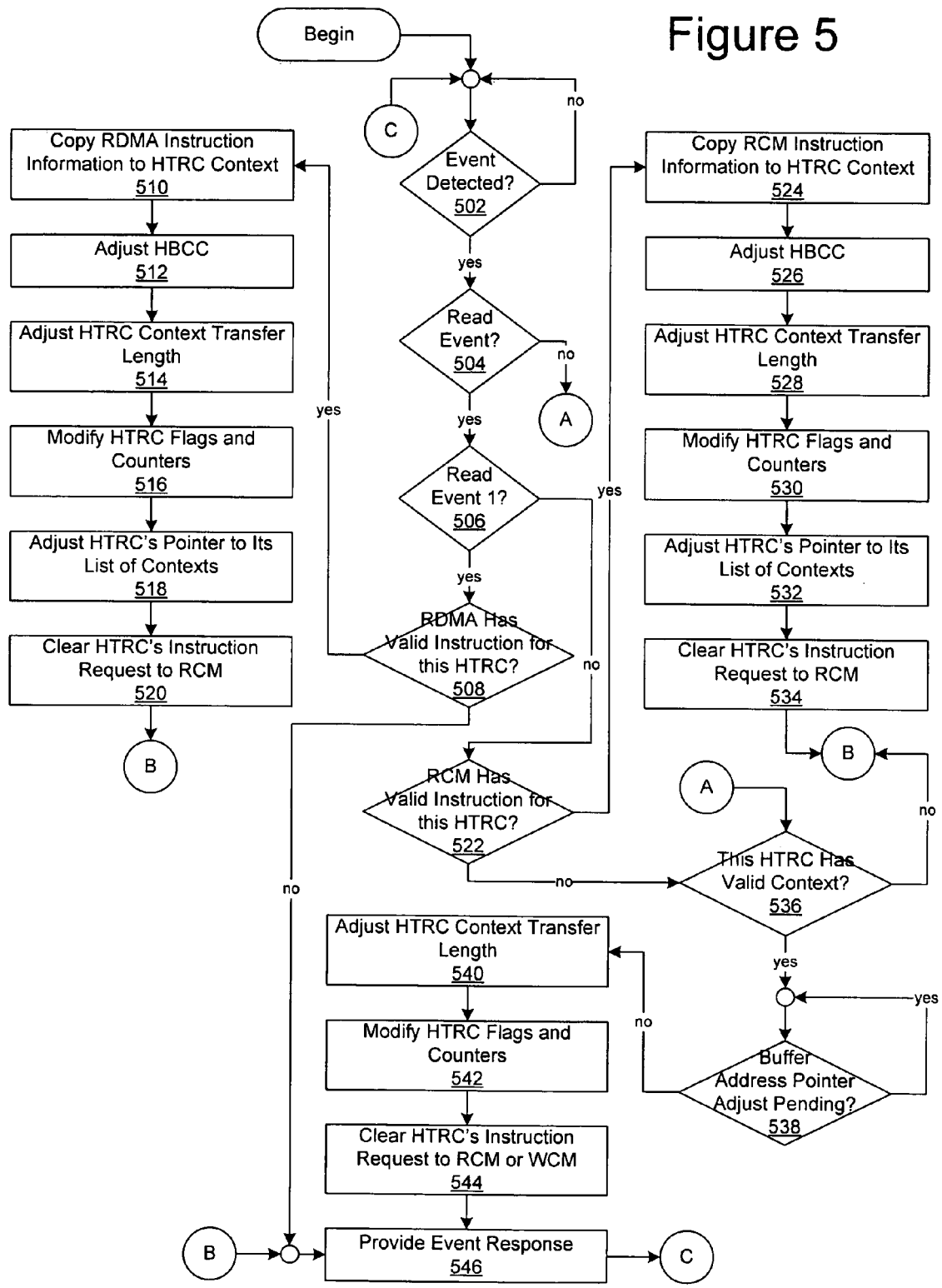

If in block 404 the instruction request is determined to be a write instruction remove request, then the WCM handles the instruction remove. The WCM resets any request to the protocol engine (block 434). It also disables the local WCM arbiter of HTRC requests so it will ignore any HTRC requests that may be pending (block 436). Now that the WCM is in a static condition, it creates one write instruction remove event that is passed to all of the HTRCs (block 438). Refer to FIG. 5 for more detail about how each HTRC that is working on a write transfer restores its context based on this event. Once the WCM has confirmation that the event has been completed (block 440), it waits for another confirmation from each HTRC that each HTRC has finished a new process to create a write instruction request, if a write instruction request is possible at this time (block 442). Then the WCM enables its arbiter to start looking at the HTRC requests again (block 444) and activity continues as normal, returning to block 402.

FIG. 5 illustrates the lower level HTRC operation of data transfer with instruction removal in accordance with a preferred embodiment of the present invention. More particularly, with reference to FIG. 5, operation begins and continues as normal with the HTRCs fetching contexts and generating data transfer instructions for the system to process. The instruction remove sequence is running in parallel and waits until the high level instruction remove sequence (as described in FIG. 4) generates a write or read instruction remove event to the HTRC (block 502). When an event is detected, the event is checked to see if it is a read or write event (block 504). If it is a read event, then the event is checked to see if it is the first read event or the second read event (block 506). If the read event is the read instruction remove event 1 from the sequence in FIG. 4, then the HTRC checks to see if the RDMA has a valid instruction that originated at this HTRC (block 508). The RDMA instruction is checked before the RCM instruction because if it exists, it was the first of the two and is the one that represents the boundary of what has been transferred for this HTRC. If the RDMA does not have an instruction for this HTRC, then the HTRC is done processing this event and an event response is given back to the sequencer described below with respect to block 546. If the RDMA does have an instruction for this HTRC in block 508, then operation continues at block 510.

Blocks 510 through 520 describe the process for the HTRC to adjust its context and related flags and pointers to reflect the transfer boundary where the RDMA was at when the read instruction remove occurred. The HTRC copies the information from the RDMA instruction to the related HTRC context fields (block 510) so the HTRC context looks like it did back when it created the instruction that is in the RDMA, with the exception of dynamic fields that the RDMA has since adjusted during the data transfer. The dynamic fields include fields such as the instruction transfer length, the LSA, the CRC seed, the sector byte count, and the buffer address pointer. These dynamic fields, except for the instruction transfer length, are copied directly from the current state of the transfer that is in the RDMA. The HBCC is adjusted by adding the outstanding committed sector release counter to the current value in the HTRC's HBCC (block 512). The HTRC context's instruction transfer length is derived by adding the RDMA's remaining transfer length with the RDMA's pre-adjusted HTRC context transfer length (block 514). Then the various flags and counters in the HTRC that represent the state of outstanding instructions need to be modified to represent no outstanding contexts (block 516). For example, the outstanding committed sector release counter is zeroed. Also, the HTRC's pointer to the list of contexts in the buffer is modified to point to the context that represents the instruction that is in the RDMA (block 518). This may or may not be the same context that is in the HTRC before the read instruction remove. And, the HTRC clears its instruction request to the RCM since it will need to recalculate all of the information for a new instruction based on the new context state after the instruction remove (block 520). After all of these steps, a response is provided back to the sequence described in FIG. 4 to indicate that this event has been handled by the HTRC (block 546). This response is a common response to represent all of the HTRCs since each HTRC can perform the steps described above simultaneously in a fixed amount of time.

If in block 506 the HTRC detects that the current read event is the read instruction remove event 2 from the sequence described in FIG. 4, then it proceeds to block 522. In block 522, the HTRC checks to see if the instruction in the RCM originated from this HTRC and either the RDMA does not have an instruction or the RDMA's instruction did not originate from this HTRC. In this case, the instruction in the RCM represents the current boundary for transfers being generated by this HTRC, and blocks 524 through 534 are executed to restore the HTRC context from the RCM's instruction. These steps are performed exactly as they were for the RDMA's instruction, only now the same information is taken from the RCM whose dynamic instruction fields have not been modified yet. After block 534 is executed, the HTRC proceeds to give the event response (block 546).

If in block 522 the HTRC does not detect that an update from the RCM should occur, then it proceeds to block 536. In block 536, the HTRC checks to see if both the RCM and RDMA either do not have an instruction or have an instruction that is not from this HTRC. If this is true and the HTRC has a valid context, then the HTRC responds to the read instruction remove event 2 by performing the steps represented by blocks 538 to 544. Otherwise, this instruction remove does not affect this HTRC, so the sequence proceeds to block 546 to give the event response. In block 538, the HTRC waits for any pending buffer address pointer adjusts to complete. For example, if a previous instruction was successfully passed to the RCM and RDMA and the RDMA transfer was completed, and the associated buffer address pointer adjustment in the HTRC takes some time to complete, the HTRC needs to let this adjustment complete before modifying state of the HTRC because of the instruction remove. This is different than the cases where the HTRC is being updated from the RCM or RDMA. In those cases, any pending buffer address adjustment is related to either the instruction in the RCM or the RDMA, so it can be aborted immediately on the instruction remove. Once any pending buffer address pointer adjustment is complete, then block 538 proceeds to adjust the HTRC context's transfer length (block 540). This adjustment is only needed if the HTRC had already decremented an amount from the context's transfer length in anticipation of giving an instruction request to the RCM. This adjustment just adds the calculated HTRC's instruction transfer length back into the HTRC context's transfer length. Then any flags or counts associated with the instruction in the HTRC are modified to indicate that there is no instruction ready in the HTRC (block 542). The instruction request to the RCM is cleared (block 544) and then the HTRC has finished the handling of the instruction remove request and proceeds to block 546 to give the event response.

If in block 504 the HTRC detects that the current event is for a write instruction remove event from the sequence described in FIG. 4, then the HTRC proceeds to block 536 and performs the same context restore steps as is described above for blocks 536 through 544. Block 536 only verifies that the HTRC context is valid in this case (the RCM and RDMA state do not matter for a write instruction remove). The result of this sequence is the same as for the read; any instructions that the HTRC is preparing are discarded and the HTRC starts over on the process to create a new instruction. The event response is given after blocks 536 through 544 have completed (block 546). After the even response is given (block 546), the sequence returns to block 502 to wait for the next event from the sequence described by FIG. 4.

Thus, the present invention solves the disadvantages of the prior art by providing a mechanism for removal of instructions for context re-evaluation. The mechanism of the present invention allows removal of pending instructions that still need to be issued or have partially transferred. The mechanism maintains accurate counts of partial transfers and, because the protocol data format is not a boundary that the host logic needs to track, the mechanism can be connected to many protocols, such as SAS, FC, or serial advanced technology attachment (SATA). Many protocols can open and close connections and can be controlled by a context/instruction DMA architecture; therefore, having the flexibility provided by the present invention is advantageous.

The mechanism of the present invention provides a non-blocking scheme so that instructions can be placed back into the HTRC to be re-evaluated based on the state of the protocol bus. If a connection to a different host initiator device occurs after an instruction is issued to the protocol engine, then the mechanism of the present invention allows the instruction to be placed back so that another instruction from another HTRC has a chance to move forward. This results in a higher throughput on the bus, because each HTRC transfers as much data as possible on each bus connection, given the available contexts in the HTRCs. If the instruction removal mechanism was not available, then the RCM/RDMA and/or WCM would have to block further HTRC's instructions until the connection could be re-established with that host initiator device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and the practical application and to enable others of ordinary skill in the art to understand the invention for various embodiments with various modifications as are suited to the particular use contemplated.

What is claimed is:

1. A computer-implemented method for transferring data, the computer-implemented method comprising:
   receiving an instruction in a direct memory access controller, wherein the instruction comprises data and a context, wherein the context comprises information that is necessary in order for the direct memory access controller to program a direct memory access transfer of the data;
   after receiving the instruction, receiving an external request to remove the instruction from processing in the direct memory access controller, wherein the external request is received from a device external to the direct memory access controller;
   responsive to receiving the external request, transferring the context to a list of pending contexts; and
   responsive to transferring the context, re-processing the instruction in the direct memory access controller.

2. The computer-implemented method of claim 1 wherein the list of pending contexts comprises a second context, and wherein the computer-implemented method further comprises:
   responsive to transferring, prioritizing the list of pending contexts before re-processing the instruction, wherein prioritizing comprises determining whether to process the second context before the first context, wherein prioritizing determines whether second data associated with the second context will be processed before re-processing the instruction.

3. The computer-implemented method of claim 1 further comprising:
   beginning processing of the instruction before receiving the external request.

4. The computer-implemented method of claim 3 further comprising:
   removing the instruction from processing in the direct memory access controller before re-processing the instruction.

5. The computer-implemented method of claim 1 wherein transferring the context aborts any activity related to preparing further data instructions.

6. The computer-implemented method of claim 1 wherein transferring the context holds off further decisions about which context in the list of pending contexts will be processed until all pending contexts have been transferred to the list.

7. The computer-implemented method of claim 1 further comprising:
   before transferring, determining when a state of the direct memory access controller is stable; and
   responsive to the state being unstable, waiting for the state to become stable before transferring.

8. The computer-implemented method of claim 1 further comprising:
   waiting for feedback that transferring has completed.

9. The computer-implemented method of claim 1 further comprising:
   maintaining a count of partial transfers, wherein partial transfers comprise those instructions that have been partially processed by the direct memory access controller.

10. The computer-implemented method of claim 1 wherein the list is maintained in a first host thread retrieval channel that is part of the direct memory access controller.

11. The computer-implemented method of claim 10 further comprising:
    responsive to a second external device establishing a connection with the direct memory access controller, processing a second instruction from a second host thread retrieval channel even if the instruction is removed from processing, wherein the second host thread retrieval channel is part of the direct memory access controller and distinct from the first host thread retrieval channel, and wherein the second external device is external to the direct memory access controller.

12. A data processing system comprising:
    a bus;
    a memory connected to the bus;
    a processor connected to the bus;
    a direct memory access controller connected to the bus, wherein the direct memory access controller is programmed to:
    receive an instruction in the direct memory access controller, wherein the instruction comprises data and a context, wherein the context comprises information that is necessary in order for the direct memory access controller to program a direct memory access transfer of the data;

after receiving the instruction, receive an external request to remove the instruction from processing in the direct memory access controller, wherein the external request is received from a device external to the direct memory access controller;

responsive to receiving the external request, transfer the context to a list of pending contexts; and responsive to transferring the context, re-process the instruction in the direct memory access controller.

13. The data processing system of claim 12 wherein the list of pending contexts comprises a second context, and wherein the direct memory access controller is further programmed to:

responsive to transferring, prioritize the list of pending contexts before re-processing the instruction, wherein prioritizing comprises determining whether to process the second context before the first context, wherein prioritizing determines whether second data associated with the second context will be processed before re-processing the instruction.

14. The data processing system of claim 12 wherein the direct memory access controller is further programmed to:

begin processing of the instruction before receiving the external request.

15. The data processing system of claim 12 wherein the direct memory access controller is further programmed to:

remove the instruction from processing in the direct memory access controller before re-processing the instruction.

16. The data processing system of claim 12 wherein transferring the context aborts any activity related to preparing further data instructions.

17. The data processing system of claim 12 wherein transferring the context holds off further decisions about which context in the list of pending contexts will be processed until all pending contexts have been transferred to the list.

18. The data processing system of claim 12 wherein the direct memory access controller is further programmed to:

before transferring, determine when a state of the direct memory access controller is stable; and responsive to the state being unstable, wait for the state to become stable before transferring.

19. The data processing system of claim 12 wherein the direct memory access controller is further programmed to:

wait for feedback that transferring has completed.

20. The data processing system of claim 12 wherein the direct memory access controller is further programmed to:

maintain a count of partial transfers, wherein partial transfers comprise those instructions that have been partially processed by the direct memory access controller.

21. The data processing system of claim 12 wherein the list is maintained in a first host thread retrieval channel that is part of the direct memory access controller.

22. The data processing system of claim 21 wherein the direct memory access controller is further programmed to:

responsive to a second external device establishing a connection with the direct memory access controller, process a second instruction from a second host thread retrieval channel even if the instruction is removed from processing, wherein the second host thread retrieval channel is part of the direct memory access controller and distinct from the first host thread retrieval channel, and wherein the second external device is external to the direct memory access controller.

* * * * *